United States Patent
Hannula

(10) Patent No.: US 6,941,270 B1
(45) Date of Patent: Sep. 6, 2005

(54) APPARATUS, AND ASSOCIATED METHOD, FOR LOADING A MOBILE TERMINAL WITH AN APPLICATION PROGRAM INSTALLED AT A PEER DEVICE

(75) Inventor: Esko Hannula, Vuorentausta (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/337,113

(22) Filed: Jun. 21, 1999

(51) Int. Cl.⁷ .......................... G06F 17/60; H04K 1/00
(52) U.S. Cl. .................... 705/1; 705/76; 705/79; 705/26; 705/500; 713/201; 713/202; 713/155; 380/21; 380/25
(58) Field of Search ............... 705/1, 76, 79, 705/26, 500; 713/201, 202, 155; 380/21, 380/25; 709/200, 230

(56) References Cited

U.S. PATENT DOCUMENTS

| | | | | |
|---|---|---|---|---|
| 5,189,287 A | * | 2/1993 | Parienti ...................... 235/375 |
| 5,457,746 A | * | 10/1995 | Dolphin ........................ 380/4 |
| 5,745,879 A | * | 4/1998 | Wyman ....................... 713/201 |
| 5,748,737 A | * | 5/1998 | Daggar ........................ 235/379 |
| 5,796,832 A | * | 8/1998 | Kawan ........................ 380/270 |
| 5,845,282 A | * | 12/1998 | Alley et al. ..................... 707/10 |
| 5,875,404 A | * | 2/1999 | Messiet .................. 379/357.01 |
| 5,878,337 A | * | 3/1999 | Joao et al. .................. 455/406 |
| 5,898,777 A | * | 4/1999 | Tycksen, Jr. et al. ......... 705/53 |
| 5,914,941 A | * | 6/1999 | Janky ......................... 370/313 |
| 5,926,624 A | * | 7/1999 | Katz et al. ..................... 705/27 |
| 5,991,410 A | * | 11/1999 | Albert et al. ................. 380/270 |
| 6,000,607 A | * | 12/1999 | Ohki et al. .................. 235/379 |
| 6,014,429 A | * | 1/2000 | LaPorta et al. ............. 340/7.21 |
| 6,016,476 A | * | 1/2000 | Maes et al. ..................... 705/1 |
| 6,018,724 A | * | 1/2000 | Arent ........................... 705/39 |
| 6,061,664 A | * | 5/2000 | Pieterse et al. ............... 705/39 |
| 6,070,067 A | * | 5/2000 | Nguyen et al. ............. 455/407 |
| 6,088,730 A | * | 7/2000 | Kato et al. ................... 455/556 |
| 6,094,640 A | * | 7/2000 | Goheen ......................... 705/5 |
| 6,134,593 A | * | 10/2000 | Alexander et al. .......... 709/229 |
| 6,144,848 A | * | 11/2000 | Walsh et al. ............. 235/379 |
| 6,148,405 A | * | 11/2000 | Liao et al. .................. 380/255 |
| 6,155,484 A | * | 12/2000 | Sasaki ........................ 235/379 |

(Continued)

FOREIGN PATENT DOCUMENTS

JP          9-11-143976      * 11/1999      ........... G06F 19/00

OTHER PUBLICATIONS

Michael Dempsey, Players Pit Wits Across The Globe, Dec. 3, 1997, Financial Times, 1, p. 13.*

Primary Examiner—James P. Trammell
Assistant Examiner—Kambiz Abdi

(57) ABSTRACT

Apparatus, and an associated method, provides for selective downloading of an application program stored at a provider mobile terminal to a recipient mobile terminal. The application program includes indicia indicating costs for usage of the application program and the identity of an entity to whom charges accruing for use of the application program are to be credited. If monetary resources are determined to be available to the recipient mobile terminal for use of the application program, downloading of the application program to the recipient mobile terminal is effectuated. Thereafter, a connection is made to a payment account depository, such as by way of an Internet backbone, to effectuate electronic payment for use at the recipient mobile terminal of the application program.

22 Claims, 3 Drawing Sheets

U.S. PATENT DOCUMENTS

| | | | |
|---|---|---|---|
| 6,216,014 B1 * | 4/2001 | Proust et al. | 455/558 |
| 6,223,291 B1 * | 4/2001 | Puhl et al. | 713/201 |
| 6,226,618 B1 * | 5/2001 | Downs et al. | 705/1 |
| 6,259,769 B1 * | 7/2001 | Page et al. | 235/380 |
| 6,282,183 B1 * | 8/2001 | Harris et al. | 370/230 |
| 6,282,522 B1 * | 8/2001 | Davis et al. | 235/375 |
| 6,311,167 B1 * | 10/2001 | Davis et al. | 235/379 |
| 6,331,865 B1 * | 12/2001 | Sachs et al. | 345/741 |
| 6,331,972 B1 * | 12/2001 | Harris et al. | 340/10.1 |
| 6,372,974 B1 * | 4/2002 | Gross et al. | 84/600 |
| 6,424,623 B1 * | 7/2002 | Borgstahl et al. | 370/230 |
| 2002/0087656 A1 * | 7/2002 | Gargiulo et al. | 709/217 |

* cited by examiner

APPARATUS, AND ASSOCIATED METHOD, FOR LOADING A MOBILE TERMINAL WITH AN APPLICATION PROGRAM INSTALLED AT A PEER DEVICE

The present invention relates generally to mobile e-commerce. More particularly, the present invention relates to apparatus, and an associated method, by which to load an application program, installed at a provider mobile terminal on to a recipient mobile terminal and thereafter crediting an appropriate entity for use of the application program at the recipient mobile terminal. An efficient manner by which to distribute the application program is thereby provided.

BACKGROUND OF THE INVENTION

Utilization of wireless communication systems to communicate telephonically has achieved wide popularity in recent years. Because a wireline connection is not required to effectuate telephonic communication, communication by way of a wireless communication system is possible at a location to which formation of a wireline connection would be impractical or impossible.

Cellular communication networks, for instance, have been installed throughout significant portions of the world. Large numbers of subscribers to such cellular networks are able to communicate telephonically when positioned in areas encompassed by such cellular networks. Telephonic communication of both voice and data are permitted in such networks.

A subscriber to a cellular communication network communicates therethrough by way of a mobile terminal. Some cellular communication networks utilize digital communication techniques in which information is digitized prior to its communication and subsequent to its reception. Processing circuitry is utilized to act upon information, prior to its transmission, and subsequent to its reception.

Technological advancements have permitted the miniaturization of the circuitry of the processing circuitry, as well as other circuitry, of which mobile terminals are formed. Such advancements have permitted the packaging of mobile terminals to correspondingly be miniaturized to increase the portability of such mobile terminals. Mobile terminals are regularly of physical dimensions which permit their carriage by a user and stored, for instance, in a shirt pocket, or the like, of the user.

The technological advancements which have permitted the miniaturization of the circuitry of mobile terminals have also permitted the miniaturization of other electronic devices, such as computing devices. And, merging of technologies, has resulted in the development of mobile terminals which include capability more conventionally associated with computing devices. And, computing devices increasingly include additional communication capabilities as a result of technological advancements and merging of technologies. The term "mobile terminal" shall herein refer to a broad range of devices and not solely devices operable merely to communicate in a cellular communication system. Point-to-point connections conventionally provided between computing devices, such as infrared or Bluetooth connections, are accordingly possible between mobile terminals, as defined herein.

Processing circuitry is generally capable of running, i.e., executing, content, also referred to herein as an application program. The terms content and application programs shall be used interchangeably herein and shall each refer to digital information. Content, executable or otherwise usable by the processing circuitry is typically stored at a memory device which is accessible by the processing circuitry. The content is initially stored at the storage device by downloading the content thereto. Downloading content to a mobile terminal is regularly performed. Transfer of information utilizing the World Wide Web (www), for instance, pertains primarily to such transfer of information. And, a Nokia 9000 Series TM permits the downloading of content thereto by way of a cable or infrared connection from a source, such as a personal computer.

The origin and integrity of downloaded content is provided by various manners. For instance, Authenticode™ provided by Microsoft™ is an example of a commercially-available manner by which to verify the origin and integrity of downloaded content. The use of Authenticode™ makes use of certificates which are defined in an ISOX.509 standard to verify the origin and integrity of downloaded content. Other manners by which to verify the origin and integrity of downloaded content typically make use of such certificates. As noted above, existing mobile terminals are capable of receiving content downloaded thereto. Increased amounts of, and types of, content shall likely be available to be downloadable to a mobile terminal in the future. Some, and perhaps much, of such content is private-domain content. That is to say, an owner, or other entity, has property rights in such content, and is entitled to payment for use of such content. Convenient manners by which to market, distribute and invoice for use of such content are needed.

Perhaps one of the most effective manners by which to market content to a prospective user of the content is by way of another user of the content, already-installed at the other user's mobile terminal. Such marketing, in essence, is a mouth-to-mouth marketing method.

If a manner could be provided by which to permit immediate downloading of the content from the mobile terminal at which the content is already-installed to the mobile terminal of a user desiring to have such content installed on that user's mobile terminal, while also providing a manner by which to insure that the private-domain entity having the property rights in the content shall be properly credited for the additional user's use of the content, a new, and efficient manner by which to market content would improve marketing possibilities associated with the content.

It is in light of this background information related to the floating and execution of content at a mobile terminal that the significant improvements of the present invention have evolved.

SUMMARY OF THE INVENTION

The present invention, accordingly, advantageously provides apparatus, and an associated method by which to load content, installed at a provider mobile terminal, from the provider terminal to a recipient mobile terminal. The content includes indicia of the entity having property rights in the application program. Once loaded at the recipient mobile terminal, the entity having the property rights in the content is credited by way of electronic payment, for use of the content at the recipient mobile terminal.

The provider mobile terminal is used as a source of content. Prior to loading the content at the recipient mobile terminal a determination is made as to whether resources are available to pay the entity having the property rights in the content if the content is downloaded, and later executed, at the recipient mobile terminal. If a determination is made that resources are available, the content is downloaded to the recipient mobile terminal. Electronic payment is thereafter made from the recipient mobile terminal to the credit of the entity having the property rights in the content, thereby to permit the content to be executed at the recipient mobile terminal.

An effective manner by which to market the use of content is thereby provided. That is to say, a user of a recipient mobile terminal is able to view execution of the content at the provider mobile terminal, and responsive thereto decide that the content should be downloaded to the recipient mobile terminal to be used thereat. Nearly-immediately, such downloading of the content can be effectuated. A decision to download the content can also be made by the user of the recipient mobile terminal to download the content upon the recommendation of, for instance, the user of the provider mobile terminal. The provider mobile terminal, a peer device of the recipient mobile terminal, forms merely a source of the content for the recipient mobile terminal. Registration of, or other form of verification of, the recipient mobile terminal need not be performed by the provider mobile terminal. Charges for use of, and permission for use of, the content at the recipient mobile terminal is made by way of electronic payment from the recipient mobile terminal to the credit of the entity having the property rights in the content.

In one aspect of the present invention, apparatus is provided to a mobile terminal to permit selection of an application program to be downloaded thereto from a peer device. The mobile terminal, for instance, is operable in a cellular communication system, and the application program downloaded thereto forms any of various types of content, such as images, or executable application programs. A connector, formed of a downloader application, is run at the recipient mobile terminal. A corresponding connector, here also formed of a downloader application, is run at a provider mobile terminal. As a result of running of the downloader applications, information is exchanged between the provider and recipient mobile terminals. Selection is then made of the application program to be downloaded to the recipient mobile terminal. Determination is made of the creditworthiness of the recipient mobile terminal. That is to say, a determination is made as to whether financial resources are available for charges accruing as a result of use of the application program at the recipient mobile terminal to pay charges accruing to an appropriate payee entity. If a determination is made that financial resources are available, downloading of the application program to the recipient mobile terminal by way of a communication link formed between the connectors is made.

In another aspect of the present invention, electronic indicia of creditworthiness is maintained at the recipient mobile terminal. The indicia of creditworthiness is accessed to determine whether financial resources are available to make payment to the appropriate payee entity for use of the application program at the recipient mobile terminal. In one implementation, the indicia of creditworthiness is formed of a payment card releasably engageable at the recipient mobile terminal. In another implementation, the indicia of creditworthiness forms electronic wallet software embodied, and executable, at the recipient mobile terminal. Debits are further made from the indicia of creditworthiness to effectuate payment for use of the application program at the recipient mobile terminal.

In another aspect of the present invention, apparatus is provided for a recipient mobile terminal to effectuate payment to a payee entity for use of an application program at the recipient mobile terminal subsequent to downloading of the program thereto. A connector is provided to permit connection to a payment account depository associated with the payee entity. A connection is effectuated, for instance, by way of an internet backbone to which the payment account depository is connected. The payment account depository is located, for instance, at a computer server at which an account of the payee entity is credited by debiting the indicia of creditworthiness at the recipient mobile terminal. Once payment is effectuated, use of the application program at the recipient mobile terminal is permitted.

In these and other aspects, therefore, apparatus, and an associated method, is provided for facilitating copying of content, executable at a provider mobile terminal, to a recipient mobile terminal. Thereafter, the content is executable at the recipient mobile terminal by a recipient-terminal user. Execution of the content at the recipient mobile terminal at least selectably incurs a fee payable to a payee entity. The recipient mobile terminal is a peer device of the provider mobile terminal. A recipient mobile terminal downloading connector is selectably operable to effectuate a communication link with the provider mobile terminal. And, a credit payment indicator contains at least an indicia of creditworthiness of the recipient mobile terminal. A downloading controller is coupled to the payment indicator and to the downloading connector. The downloading controller permits the recipient-terminal downloading connector to effectuate downloading of the application program to the recipient mobile terminal if the payment indicator indicates the indicia of creditworthiness to be at least a selected threshold.

A more complete appreciation of the present invention and the scope thereof can be obtained from the accompanying drawings which are briefly summarized below, the following description of the presently-preferred embodiments of the invention, and the appended claims.

DETAILED DESCRIPTION

Figure 1:
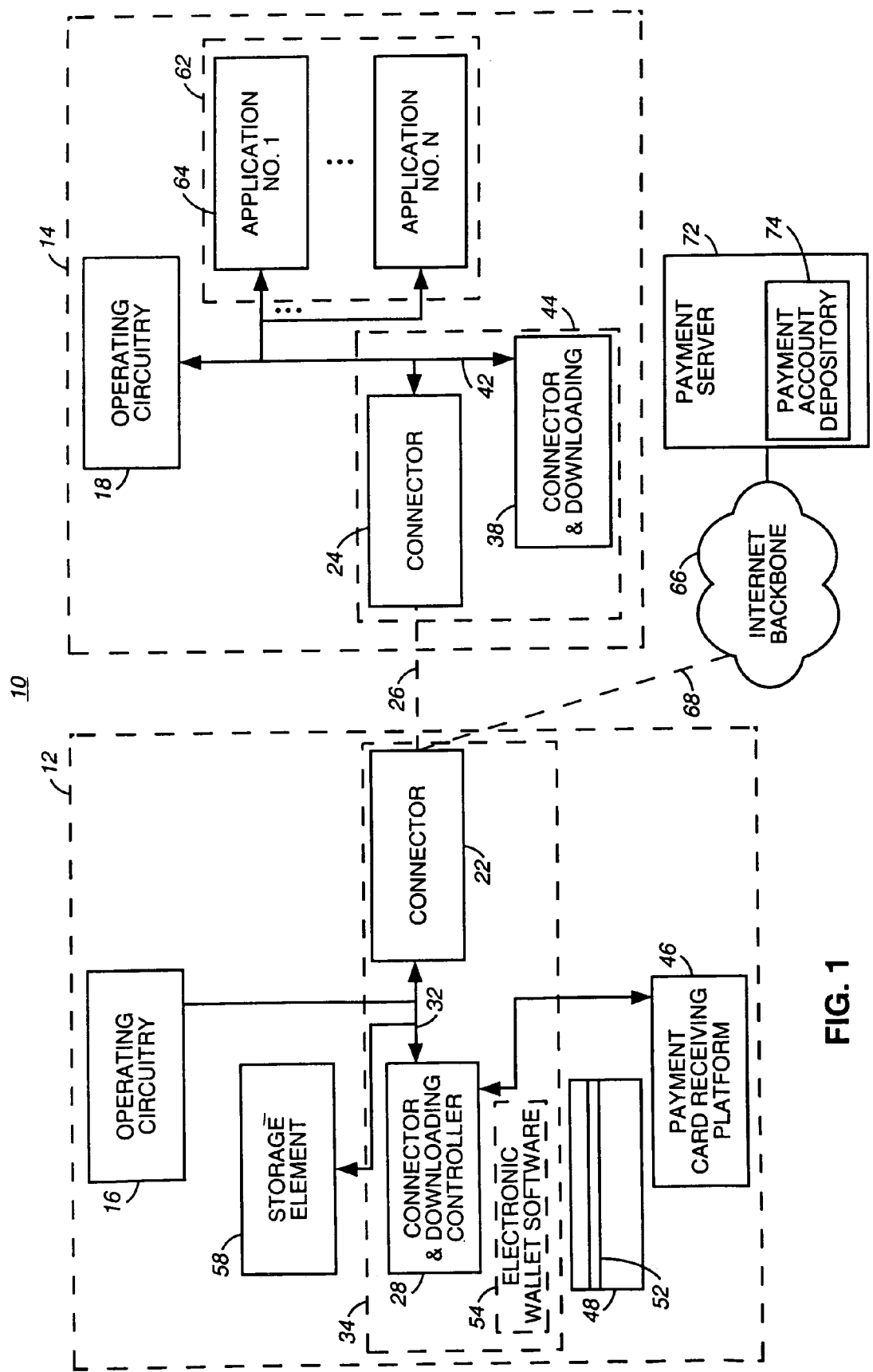
FIG. 1 illustrates a functional block diagram of a mobile terminal operable pursuant to an embodiment of the present invention to download an application program from a peer device thereto and thereafter to effectuate payment to a payee entity for use of the application program.

Referring first to FIG. 1, a system, shown generally at 10, includes a recipient mobile terminal 12 and a provider mobile terminal 14. The recipient mobile terminal and provider mobile terminals are peers of one another, and in an exemplary implementation, the terminals 12 and 14 are operable in a mobile communication system, such as a cellular communication system. It should be noted at the outset, however, that while terminals 12 and 14 shall be described with respect to their exemplary implementation, in other implementations, the mobile terminals are alternately formed of other types of devices.

The mobile terminal 12 includes mobile terminal operating circuitry 16, here comprising transceiver circuitry conventionally associated with a mobile terminal operable in a cellular, or other radio, communication system. And, the mobile terminal 14 includes mobile terminal operating circuitry 18, here also transceiver circuitry conventionally associated with the mobile terminals operable in a cellular, or other mobile, communication system. In other implementations, the circuitry 16 and 18 is formed of alternate, or additional, structure.

The recipient mobile terminal includes a connector 22 here formed of both hardware elements and a software application, such as WAP. The provider mobile terminal 14 analogously also includes a connector 24, also formed of both hardware elements and a software application, such as WAP. The connectors 22 and 24 are operable to form a communication link 26 between the two terminals. The communication link, in one exemplary implementation, is a wireless connection, such as WAP over bluetooth. In another implementation, the connector 26 is formed of an infrared connection, such as WAP over infrared.

The recipient mobile terminal further includes a connector and downloading controller 28. The connector and downloading controller and here shown to be coupled to the connector 22 by way of a line 32. In the exemplary implementation the functional elements of which the connector 22 and controller 28 are formed are, at least in part, software-implemented. Such implementation is effectuated by execution of such elements by processing circuitry 34, here represented by the block shown in dash. Analogously, the provider mobile terminal 14 also includes a controller, here referenced at 38, coupled to the connector 24 by way of the line 42. Again, as the functional elements 24 and 38, in the exemplary implementation, are at least in part software-implemented, such elements are here shown to be embodied within processing circuitry 44.

The recipient mobile terminal here further includes a payment card receiving platform 46 which receives, and supports, in supportive engagement, an electronic payment card 48. The payment card 48 is releasably engageable at the mobile terminal. The payment card includes a magnetic strip, or other storage media, for storing credit indicia, here shown at 52, such as a prepayment indicia stored thereat.

In an alternate embodiment, electronic wallet software 54, here represented by the block shown in dash, is substituted for the payment card, but performs an analogous function. That is to say, the electronic wallet software contains creditworthiness indicia stored thereat. In an embodiment in which the electronic wallet software is utilized, the recipient mobile terminal also need not include a payment card receiving platform 46. And, while not separately shown, the provider mobile terminal can also include structure corresponding to, or equivalent of, the payment card receiving platform and payment card 46 and 48 respectively.

The recipient mobile terminal 12 is further shown to include a storage device 58 at which application programs can be stored. And the provider mobile terminal 14 also includes a storage element, here shown at 62, also at which application programs can be stored. Here, a plurality of application programs 64 are represented to be stored at the storage element 62. Again, the term application program is used herein synonymous to the term content to identify any digital information.

The system 10 further illustrates a network backbone, here an Internet backbone 66. The connector 22 of the recipient mobile terminal 12 is also operable to effectuate a communication link, here indicated at 68, with the Internet backbone 66. A payment server 72 is also shown to be connected to the Internet backbone. The payment server includes payment account depository, of which a single payment account depository 74 is illustrated in FIG. 1. A communication path is thereby formable between the recipient mobile terminal and the payment server by way of the Internet backbone. Again, while not separately shown, the connector 24 of the provider mobile terminal 14, in one implementation, also permits connection of the mobile terminal 14 with the Internet backbone. In the exemplary implementation, the payment server is a computer that runs payment software and is connected to a public network, such as the Internet. A payment server may be operated for example by a credit card company, by a bank, or by a service portal, such as an Internet game site. The payment server itself is usually further connected to the computer system of a credit card company or a bank. The essential function of a payment server is that it can either perform an electronic financial transaction with a mobile terminal or mediate such a transaction between a mobile terminal and a financial institute, such as a bank.

An embodiment of the present invention provides a manner by which to download a selected application program 64, resident at the provider mobile terminal 14, to the recipient mobile terminal 12. The provider mobile terminal 14 thereby provides a source of content for the recipient mobile terminal. Subsequent to downloading of the selected application program to the recipient mobile terminal, the provider mobile terminal 14 is removed out of connection with the recipient mobile terminal. Thereafter, electronic payment is made by the recipient mobile terminal to the payment account depository 74 of the payment server 72 to permit the recipient mobile terminal's subsequent use of the application program downloaded thereto. Thereby, an entity having property rights in the application program downloaded to the recipient mobile terminal is maintained. Also, because the application program is downloadable directly from one peer device to another, that is, the provider mobile terminal to the recipient mobile terminal, an efficient manner by which to market and distribute an application program is provided.

Figure 2:
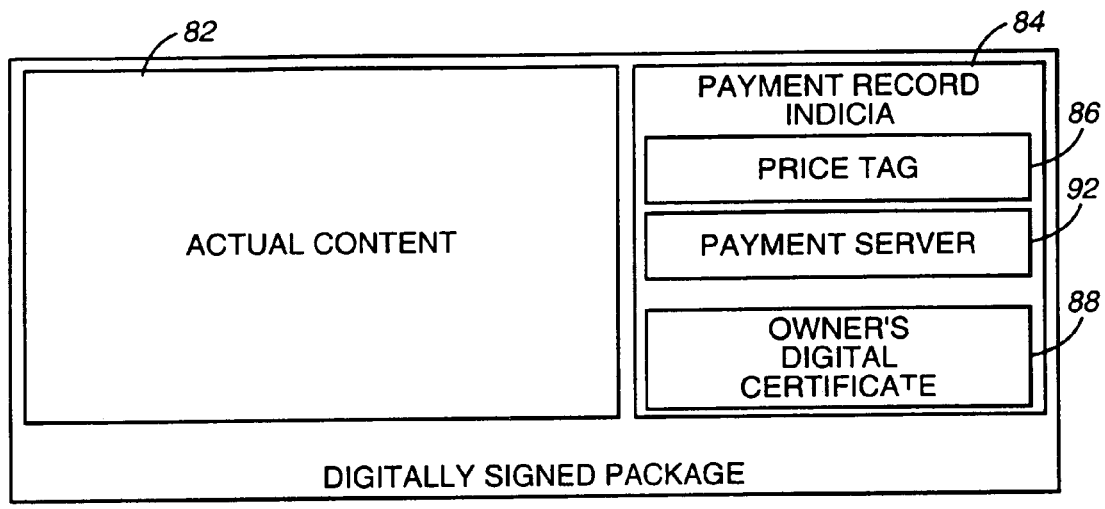
FIG. 2 illustrates a functional block diagram of the downloadable application program, downloadable during operation of an embodiment of the present invention.

FIG. 2 illustrates an exemplary application program 64. The program 64 is here shown to include actual content 82, such as data together defining source code or data forming an image, etc. The application program is a digitally-assigned package and includes payment record indicia 84. Here, the indicia 84 includes a price tag 86, that is, cost indicia associated with use of the application program. The payment record 84 here further includes an owner's digital certificate 88 which indicates an entity having property rights in the application program, here to identify the payment account depository 74 (shown in FIG. 1) at which the entity has an account deposit. And, the payment record 84, further includes a payment server identification 92 for identifying, such as with an IP address, the location of the payment server 72 (also shown in FIG. 1) at which the payment account depository 74 is located.

Figure 3:
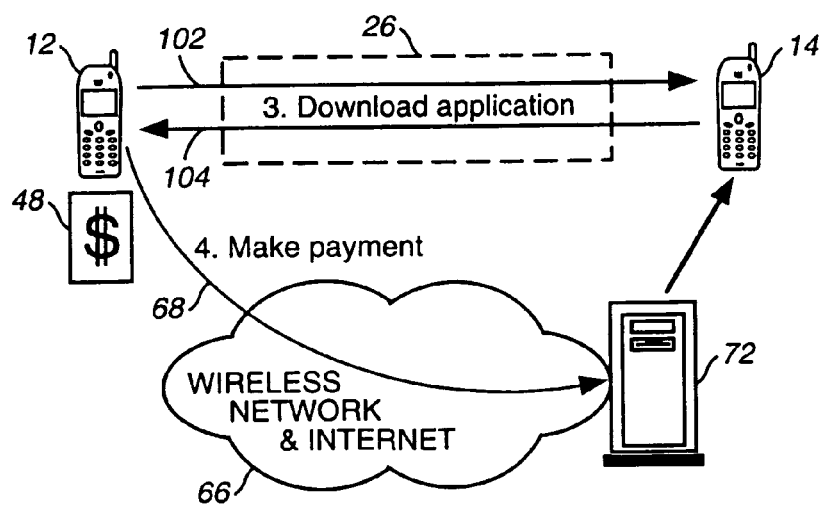
FIG. 3 illustrates a functional representation of the process of operation of an embodiment of the present invention.

FIG. 3 again illustrates the system 10, shown previously in FIG. 1. The recipient and provider mobile terminals 12 and 14 are again shown. And, the payment server 72 connected to the Internet backbone 66, is also again shown. In the implementation shown in FIG. 3, a payment card 48 is insertable into the recipient mobile terminal to be received at the payment card receiving platform 46 (shown in FIG. 1).

The mobile terminals 12 and 14 are operable in conventional manner, here to transceive communication signals in a cellular communication system. Again, in other implementations, the mobile terminals 12 and 14 are constructed in other manners to perform other functions. A user of the recipient mobile terminal is able to cause execution of application programs at the mobile terminal 12 which are resident at the mobile terminal. And, a user of the mobile terminal 14 is able to cause execution of application programs resident at the mobile terminal 14. A user of the recipient mobile terminal 12 might notice execution of an application program at the provider mobile terminal 14, or otherwise be aware of its residency at the provider mobile terminal.

If the user of the recipient mobile terminal would like to have the application program, stored at the provider mobile terminal to be resident upon the recipient mobile terminal to be executable at the recipient mobile terminal, the communication link 26 is formed between the two mobile terminals by operation of the connectors 22 and 24 of the respective mobile terminals 12 and 14. In the exemplary implementation, a point-to-point (PPP) connection is formed between the terminals by using, for example, WAP over bluetooth or an infrared channel. Downloader applications are executed at both of the terminals 12 and 14. Such downloader applications are preinstalled on the terminals and are conceptually operable in manners analogous to Direct Cable Connection™ software on Windows95™. Information is exchanged during execution of the downloader applications, including queries to the provider mobile terminal by the recipient mobile terminal, indicated by the line 102, to inquire of the application programs 64 stored at the provider mobile terminal 14. Selection is made by the user of the recipient mobile terminal of an application program that the user would like to download to the recipient mobile terminal.

Prior to downloading the selected application program, a determination is first made as to whether monetary resources are available at the recipient mobile terminal for charges accruing to the user of the recipient mobile terminal for use of the application program thereat. Such determination is made by comparing the cost indicia of the price tag 86 (shown in FIG. 2) with the credit indicia 52 (shown in FIG. 1) of the payment card (or electronic wallet software). The determination indicates whether financial resources are available at the recipient mobile terminal to effectuate payment for charges accruing for use of the application program if downloaded to the recipient mobile terminal. Subsequent to such a determination, if affirmative, the application program is downloaded, as indicated by the line 104. Thereafter, the provider mobile terminal and the recipient mobile terminal are released out of their connection therebetween.

Then, a connection is formed between the recipient mobile terminal and the Internet backbone and, in turn, to the payment server 72. In the exemplary implementation, a secured WAP is formed. An electronic transfer of money from the payment card 48 (electronic wallet software) is then effectuated to the payment account depository 74 (shown in FIG. 1) of the payment server 72. Once the transfer is made, the downloader application of the recipient mobile terminal notifies the user of the recipient mobile terminal that the necessary transfer has been effectuated. If electronic payment is not effectuated, such as by failure of the communication link between the recipient mobile terminal and the payment server, the previously-downloaded, selected application program remains unexecutable at the recipient mobile terminal.

Thereby, a manner is provided by which to efficiently market and distribute an application program. Payment to an entity having property rights in the application program are assured as the recipient mobile terminal is unable to effectuate execution of the downloaded application program unless electronic payment for use of the application program is effectuated to the payment account depository of the entity having the property rights in the application program.

Figure 4:
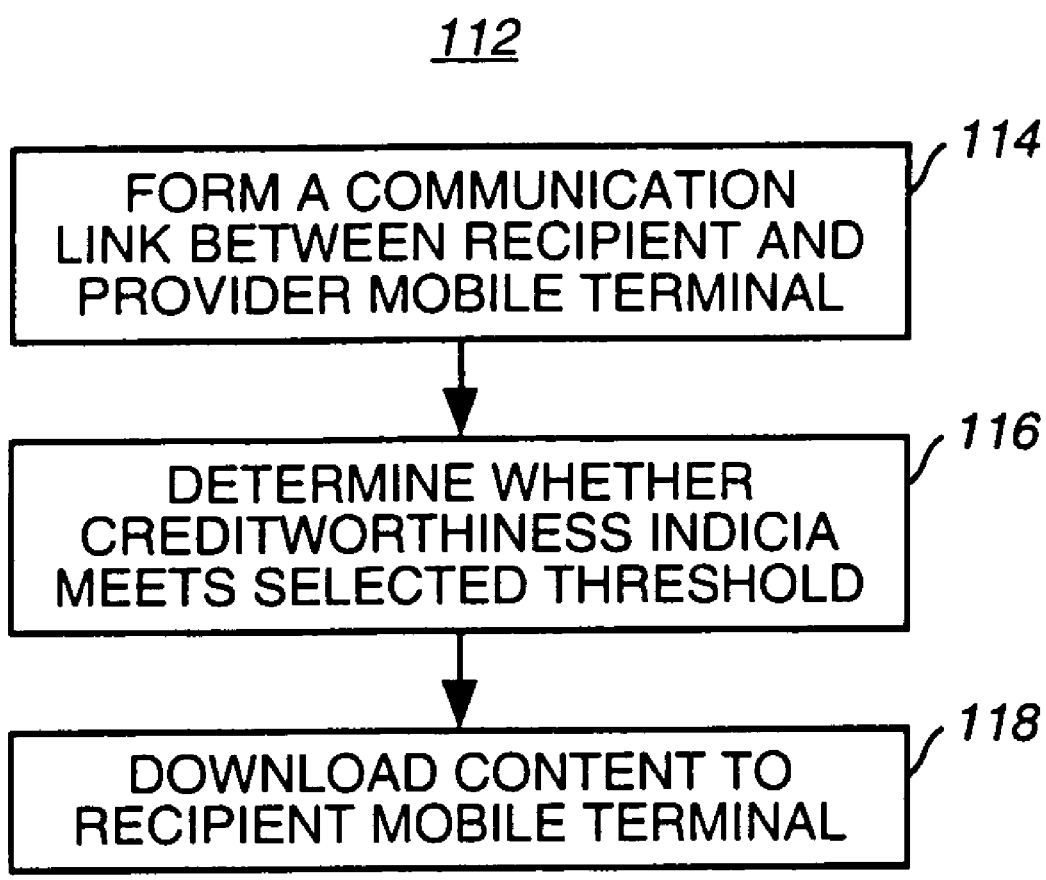
FIG. 4 illustrates a method flow diagram listing the method of operation of an embodiment of the present invention.

FIG. 4 illustrates a method, shown generally at 112, of an embodiment of the present invention. The method 112 is operable to facilitate copying of an application program, executable at a provider mobile terminal, to a recipient mobile terminal. Once copies to the recipient mobile terminal, the application program is executable by a recipient mobile terminal user.

First, and as indicated by the block 114, a communication link is formed between the recipient mobile terminal and the provider mobile terminal.

Then, as indicated by the block 116, a determination is made as to whether an indicia of creditworthiness, located at the recipient mobile terminal, is at least a selected threshold.

Then, and as indicated by the block 118, the application program is downloaded to the recipient mobile terminal if the indicia of creditworthiness is determined to be at least the selected threshold.

A manner is thereby provided by which to permit immediate downloading of content from a provider mobile terminal to a recipient mobile terminal while also ensuring that a private-domain entity having property rights in the content shall be properly credited for the additional user's use of the content.

The previous descriptions are of preferred examples for implementing the invention, and the scope of the invention should not necessarily be limited by this description. The scope of the present invention is defined by the following claims:

What is claimed is:

1. Apparatus for a recipient mobile terminal for facilitating the selective copying of executable content from a provider mobile terminal to the recipient mobile terminal, the content including cost indicia and being executable at the provider mobile terminal, wherein the mobile terminals are peer devices, said apparatus comprising:
   a recipient-terminal downloading connector selectably operable to effectuate a first communication link with the provider mobile terminal;
   a credit payment indicator for containing at least an indicia of creditworthiness of a recipient-terminal user; and
   a downloading controller coupled to said payment indicator and to said downloading connector, said downloading controller for:
      permitting said recipient-terminal downloading connector to effectuate the first communication link with the provider mobile terminal;
      determining whether the indicia of creditworthiness meets a selected threshold; and
      effecting the copying of the content by way of the first communication link if the determination indicates the indicia of creditworthiness meets the selected threshold,
   wherein the first communication link is a peer-to-peer communication link;
   wherein said downloading controller is resident in the recipient mobile terminal.

2. The apparatus of claim 1 wherein the provider mobile terminal comprises a provider-terminal downloading connector and wherein said recipient-terminal downloading connector is engageable with the provider-terminal downloading connector.

3. The apparatus of claim 2 wherein a point-to-point connection the peer-to-peer communication link is formed between the provider mobile terminal and the recipient mobile terminal when said provider-terminal downloading connector engages with said recipient-terminal downloading connector.

4. The apparatus of claim 3 wherein said provider-terminal downloading connector and said recipient-terminal downloading connector each comprise executable downloader programs.

5. The apparatus of claim 1 wherein said recipient-terminal downloading connector comprises an downloader program executable at the recipient mobile terminal.

6. The apparatus of claim 1 wherein the third-party content executable at the provider mobile terminal comprises a selected application program selected from amongst a plurality of application programs and wherein said recipient-terminal downloading connector is actuable by the recipient-terminal user to select the selected application program from amongst the plurality of application programs.

7. The apparatus of claim 1 wherein said payment indicator is releasably engageable with the recipient mobile terminal, coupled to said downloading controller when engaged with the recipient mobile terminal.

8. The apparatus of claim 7 wherein the recipient mobile terminal further comprises a card-member receiving platform and wherein said payment indicator comprises a payment card containing the indicia of the creditworthiness of the recipient-terminal user stored thereon, said payment card releasably positionable at the card-member receiving platform to be coupled to said downloading controller when positioned thereat.

9. The apparatus of claim 1 wherein said payment indicator comprises electronic-wallet software executable at the recipient mobile terminal.

10. The apparatus of claim 1 wherein the selected threshold of creditworthiness is an indication that financial resources are available and at least equal to the cost indicia.

11. The apparatus of claim 1 wherein the content further has payment account depository indicia associated therewith, the payment account depository indicia indicating the location to which said recipient-terminal downloading connector is to effectuate the second communication link.

12. A method for facilitating the selective copying of executable content from a provider mobile terminal to a recipient mobile terminal that is a peer device of the provider mobile terminal, the content including cost indicia, and after copying to be executable at the recipient mobile terminal by a recipient mobile terminal user, said method comprising:
  forming a first communication link between the recipient mobile terminal and the provider mobile terminal, wherein the first communication link is a peer-to-peer communication link;
  comparing, in the recipient mobile terminal, the indicia of creditworthiness with the cost indicia to determine whether at least a selected threshold of creditworthiness has been met; and
  downloading the content by way of the first communication link to the recipient mobile terminal if the indicia of creditworthiness is determined to be at least the selected threshold.

13. The method of claim 12 wherein the selected threshold of the indicia of creditworthiness is based on whether the user has available financial resources equal to the cost indicia.

14. The method of claim 12 comprising the additional operation, prior to said operation of comparing, to provide the indicia of creditworthiness to the recipient mobile terminal.

15. The method of claim 14 wherein said operation of providing the indicia of creditworthiness to the recipient mobile terminal comprises positioning a payment card containing the indicia of creditworthiness therein at the recipient mobile terminal.

16. The method of claim 14 wherein the indicia of creditworthiness comprises a part of electronic-wallet software executable at the recipient mobile terminal and wherein said operation of providing comprises updating the part of the electronic-wallet software.

17. The method of claim 12 wherein the content itself has proprietor indicia associated therewith, the proprietor indicia indicating a payee entity to whom a charge associated with execution of the content is selectably to accrue, and wherein said method further comprises the operations of:
  terminating the first communication link;
  forming a second communication link between the recipient mobile terminal and a payment account depository associated with the payee entity;
  debiting the indicia of creditworthiness for the content downloaded to the recipient mobile terminal; and
  crediting the payment account correspondingly.

18. A method for distributing content using a plurality of mobile peer devices, each mobile peer device operable in a communication network, said method comprising the steps:
  installing the content in a first mobile peer device, the content being associated with ownership indicia, wherein the ownership indicia comprises cost indicia and payment indicia;
  receiving, in the first mobile peer device, a request from a second mobile peer device for the ownership indicia associated with the content;
  transmitting the ownership indicia from the first mobile peer device to the second mobile peer device;
  comparing the cost indicia to creditworthiness indicia associated with the second mobile peer device to determine of the creditworthiness indicia meets a selected threshold; and
  copying the content directly from the first mobile peer device to the second mobile peer device via a peer-to-peer communication link if the comparing step at the second mobile peer device determines that the threshold has been met.

19. The method of claim 18, further comprising the step of effecting payment for the content through the communication network as indicated by the payment indicia.

20. The method of claim 19, wherein the step of effecting payment through the communication network comprises the step of debiting the creditworthiness indicia in an amount corresponding to the cost indicia.

21. The method of claim 18, wherein the peer devices operable in a communication network are mobile terminals operable in a mobile telecommunication network.

22. The method of claim 18, further comprising the step of executing the content at the first peer device.

* * * * *